Jan. 31, 1933. T. D. O'BRIEN Re. 18,726

TOWEL CABINET

Original Filed July 11, 1921 2 Sheets-Sheet 1

Inventor
THOMAS D. O'BRIEN
By Paul, Paul & Moore
ATTORNEY

Jan. 31, 1933. T. D. O'BRIEN Re. 18,726

TOWEL CABINET

Original Filed July 11, 1921 2 Sheets-Sheet 2

Inventor
THOMAS D. O'BRIEN
By Paul, Paul & Woors
ATTORNEYS

Reissued Jan. 31, 1933 Re. 18,726

UNITED STATES PATENT OFFICE

THOMAS D. O'BRIEN, OF VANCOUVER, BRITISH COLUMBIA, CANADA, ASSIGNOR, BY MESNE ASSIGNMENTS, TO STEINER SALES COMPANY, OF SALT LAKE CITY, UTAH, A CORPORATION OF UTAH

TOWEL CABINET

Original No. 1,514,393, dated November 4, 1924, Serial No. 483,788, filed July 11, 1921. Application for reissue filed January 29, 1926. Serial No. 84,786.

The object of my invention is to provide a towel cabinet in which the delivery of the towel is prevented by a locking means which may or may not be controlled by the deposit of a coin, as preferred, the locking means when released allowing a predetermined length of the toweling to be delivered before the mechanism again becomes locked to check further delivery.

A further object is to provide a towel cabinet of strong, durable construction and one which will present a neat, ornamental appearance on the wall.

Other objects of the invention will appear from the following detailed description.

The invention consists generally in various constructions and combinations, all as hereinafter described and particularly pointed out in the claims.

Figure 1:
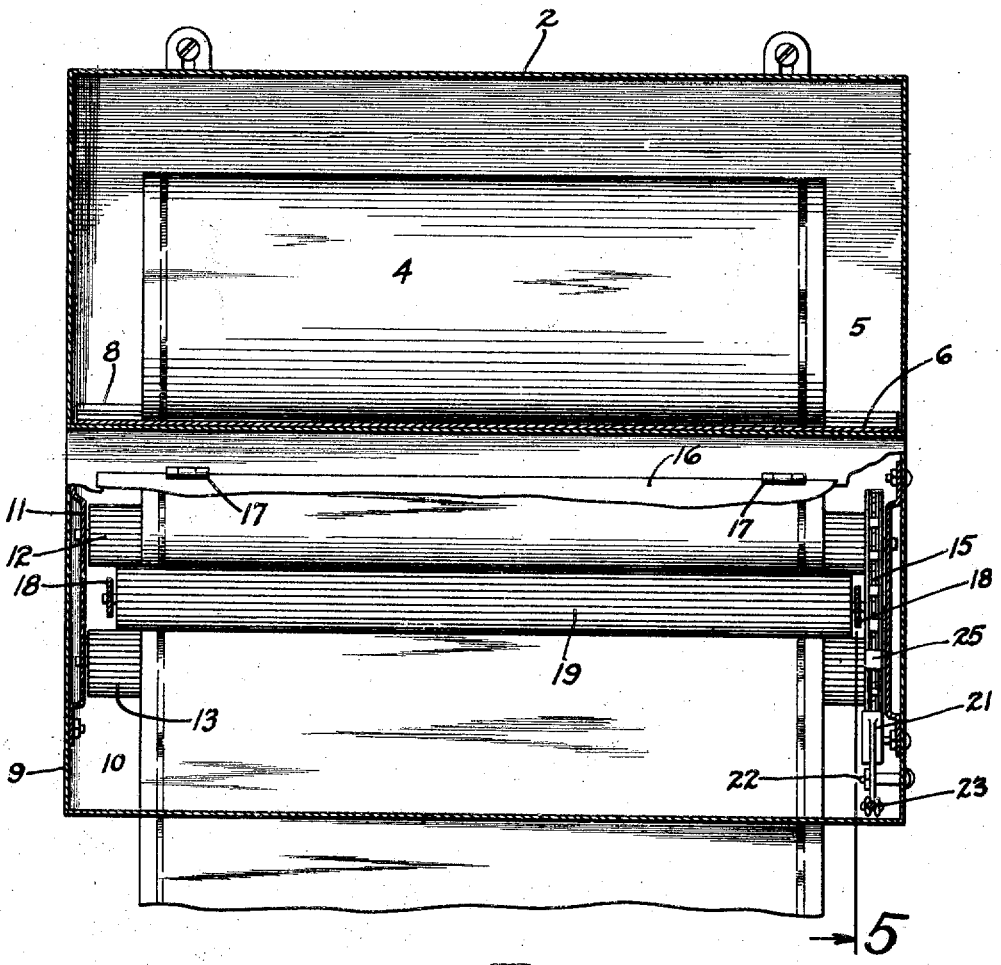
Figure 5:
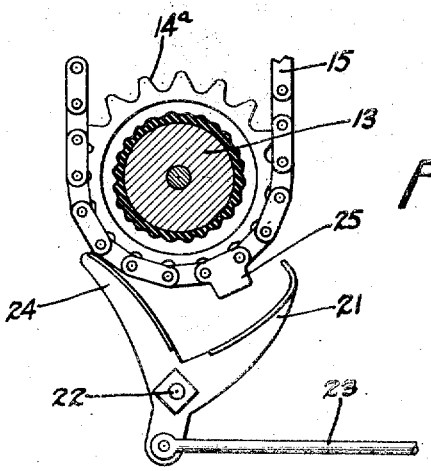
Figure 2:
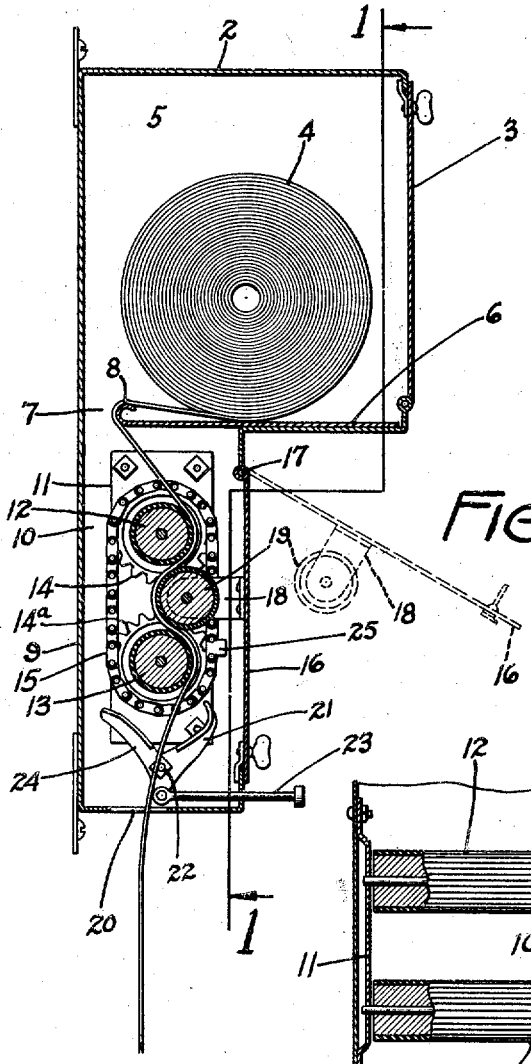
Figure 4:
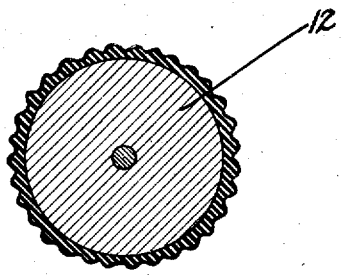
Figure 3:
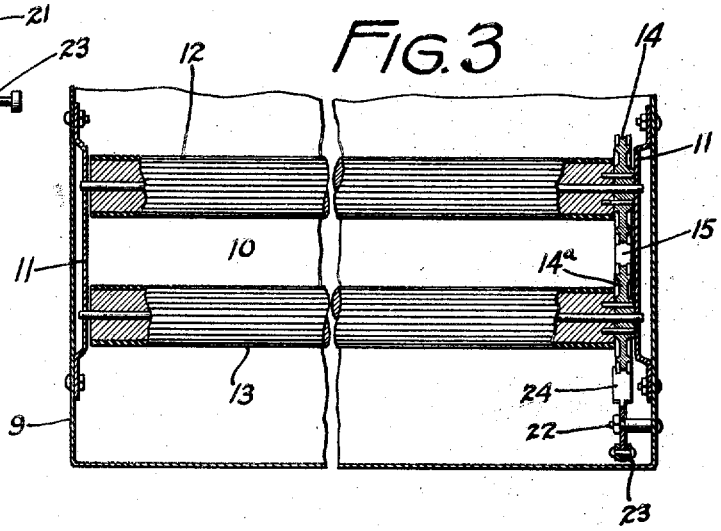

In the accompanying drawings forming part of this specification,

Figure 1 is a front view of a towel cabinet embodying my invention, taken on the section line 1—1 of Figure 2, Figure 2 is a vertical sectional view of the operating mechanism, Figure 3 is a detail sectional view, showing the manner of mounting the towel feed rolls in the cabinet, Figure 4 is an enlarged sectional view, illustrating the construction of a roll, Figure 5 is a sectional view on the line 5—5 of Figure 1.

In the drawings, 2 represents a cabinet having a hinged door 3, closing an opening through which the roll of toweling 4 is inserted into the towel chamber 5, and rests upon a floor or bottom 6. A feed opening 7 is provided in the rear of the bottom plate 6 and said plate has a turned up rounded edge 8 over which the toweling is adapted to slide. Beneath the towel chamber is an extension 9 of the cabinet, having a chamber 10 provided with brackets 11 whereon corrugated rolls 12 and 13 are mounted. These rolls are spaced apart, as shown, and have sprocket wheels 14 and 14*a* at one end over which a sprocket chain 15 passes for driving one roll synchronously from the other one. The front of the casing 9 has a door 16 hinged at 17 and normally adapted to close an opening in the front of the casing. A bracket 18 is mounted on this door and supports a corrugated roller 19 opposite the gap between the rollers 12 and 13. The toweling is fed down past the rollers 12 and 13 in position to be engaged by the roll 19 when the door is in its closed position and this engagement presses the toweling inwardly against the surface of the rollers 12 and 13 with sufficient pressure so that when the towel is drawn down by a pull of the user, the rolls will be revolved and with them the drive chain 15. The lower end of the casing 9 has a slot 20 therein through which the loose end of the towel depends in position to be conveniently grasped by the user. A dog 21 is pivoted at 22 in the lower part of the casing 9 and is provided with a push button and rod 23 by means of which the person using the towel can disengage the dog from the links of the chain 15 and render the cabinet operative to feed the toweling.

An arm 24 is mounted on the dog 21 in the path of a lug 25 on the sprocket chain 15 so that with each complete revolution of the sprocket chain, the lug will engage the arm 24 and actuate the dog 21 to a position in the path of the link of the chain carrying the lug 25 and lock it and the rolls against further movement and thereby prevent feed of the towel. The disengagement of the dog from the lug can be readily effected by pressure on the push button and rod 23. It follows therefore from this construction that when a user pulls down on the loose end of the towel a delivery can be obtained until the dog 21 is actuated to lock the roll drive chains. The length of the towel delivered will therefore be commensurate with the length of the drive chain and this length will be computed to determine how much towel each person would normally require to use for wiping purposes. The length of delivery of the towel may be regulated by increasing or decreasing the length of the chain or by adding dog operating lugs thereto.

The operation of the push rod 23 may, of course, be regulated by the deposit of a coin in the casing. Such mechanism, however, would form no part of this invention and I do not illustrate it or claim it herein.

I claim as my invention:

1. A towel cabinet comprising a casing having a chamber therein for a bolt of clean toweling and provided with a feed opening, rolls positioned in the path of the loose end of the towel and spaced apart and having a driving means between them, a roll mounted to engage the loose clean web of the towel depending in front of said rolls and press it inwardly between and into frictional engagement with said other rolls whereby all the rolls will be driven when a pull is applied to the towel, a swinging dog mounted to cooperate with said driving means and lock it and said rolls against movement, and means actuated by the movement of said driving means for moving said dog to its locking position.

2. A towel cabinet comprising a casing having a chamber therein for a bolt of clean toweling and provided with a feed opening, rolls positioned in the path of the loose end of the towel and spaced apart, a driving means between said rolls, the relative position of said chamber and rolls being such that a web of clean towel may depend in front of said rolls and the space between them, a roll mounted to engage the loose end of the towel and press it into the space between said rolls and into frictional engagement with said other rolls whereby all the rolls will be driven when a pull is applied to the towel, a swinging dog mounted to cooperate with said driving means and lock it and said rolls, and an arm on said dog actuated by the movement of said driving means for swinging said dog to its locking position.

3. A towel cabinet comprising a casing having a chamber therein for a bolt of clean toweling and provided with a feed opening, rolls positioned in the path of the loose end of the towel and spaced apart, a driving means between said rolls, an oscillating roll mounted to engage the loose clean web of the towel and press it between and into frictional engagement with said other rolls whereby all the rolls will be driven when a pull is applied to the towel, pivoted means actuated by movement of the driving means for adjustment to a position to lock the driving means, and a push button connected with said pivoted means to be actuated by the user for releasing said driving means.

4. A towel cabinet comprising a casing having a chamber for the clean toweling and a feed opening for the loose end of the towel in the bottom of said casing, rolls past which the loose end of the towel is fed, and a driving belt for said rolls, a lug connected with said driving belt, a pivoted dog having an arm in the path of said lug to be actuated thereby and move said dog to a roll locking position, and a push rod device for tripping said dog to release said rolls.

5. A towel cabinet comprising a casing having a chamber for the clean toweling and a feed opening, rolls mounted in said cabinet and past which the loose end of the towel is fed, a door adjacent to said rolls and mounted to swing outwardly therefrom, a roll carried by said door and positioned to contact with the loose end of the toweling between the other rolls when the door is closed and press the toweling into frictional contact with said rolls, a downward pull on the loose end of the towel revolving said rolls to allow the towel to feed between them.

6. A towel cabinet comprising a casing having a chamber for the clean toweling and a feed opening, a feed roll mounted in said cabinet and past which the loose towel may be fed, a door adjacent to said roll, a roll carried by said door and positioned to contact with the loose toweling when the door is closed and press the toweling into frictional contact with said feed roll, a downward pull on the loose end of the towel revolving said rolls to allow the towel to feed between them, and means for limiting the revolution of said feed roll.

7. A towel holder comprising a casing having a chamber for the clean towel, feed rolls mounted one above the other in said casing and spaced apart and having a driving connection between them, the loose end of the towel depending from said chamber in front of said rolls and through the bottom of said casing in position to be grasped and pulled by the user, and an oscillating friction roll mounted to enter the space between said feed rolls and press the depending web of the towel firmly against both of said feed rolls and thereby insure a frictional contact between the towel and said feed rolls so that downward pull on the towel will revolve said rolls, and means for limiting the revoution of said rolls and thereby the downward feed of the towel.

8. A towel holder comprising a casing having a chamber for the clean towel, a pair of feed rolls spaced apart and having a flexible driving connection between them, the loose end of the clean towel contacting with the peripheries of said rolls and depending through the bottom of said casing in position to be grasped and pulled by the user, and an oscillating friction roll mounted to enter the space between said feed rolls and press the towel web into contact therewith to insure their frictional engagement, and means for limiting the revolution of said rolls and the feed of the towel.

9. A towel cabinet comprising a support for a bolt of clean toweling, rolls positioned in the path of the towel and spaced apart, a roll mounted to engage the towel and press it into frictional engagement with said other rolls whereby all the rolls will be driven when a pull is applied to the towel, a device for locking said rolls against feeding movement, means to be actuated by the user of the towel for moving said locking device to its release position and allowing a feeding movement of the rolls, means operated through the revolution of said rolls for returning said locking device to its normal locking position to check delivery of the towel when said rolls have completed a stroke or movement.

10. A towel cabinet comprising a casing having a chamber for the clean towel and a feed opening and feed roll mounted in said cabinet and past which the loose towel is fed, a door adjacent to said roll, a roll carried by said door and positioned to contact with the loose towel when the door is closed and press it into frictional contact with said feed roll, a downward pull on the towel revolving said rolls to allow the towel to feed between them and means for limiting the revolution of said feed roll.

In witness whereof I have hereunto set my hand this 20th day of January, 1926.

THOMAS D. O'BRIEN.